April 29, 1930.  A. P. KAMROWSKI  1,756,199
TRACTOR GRAIN BINDER
Filed Feb. 9, 1928  3 Sheets-Sheet 1
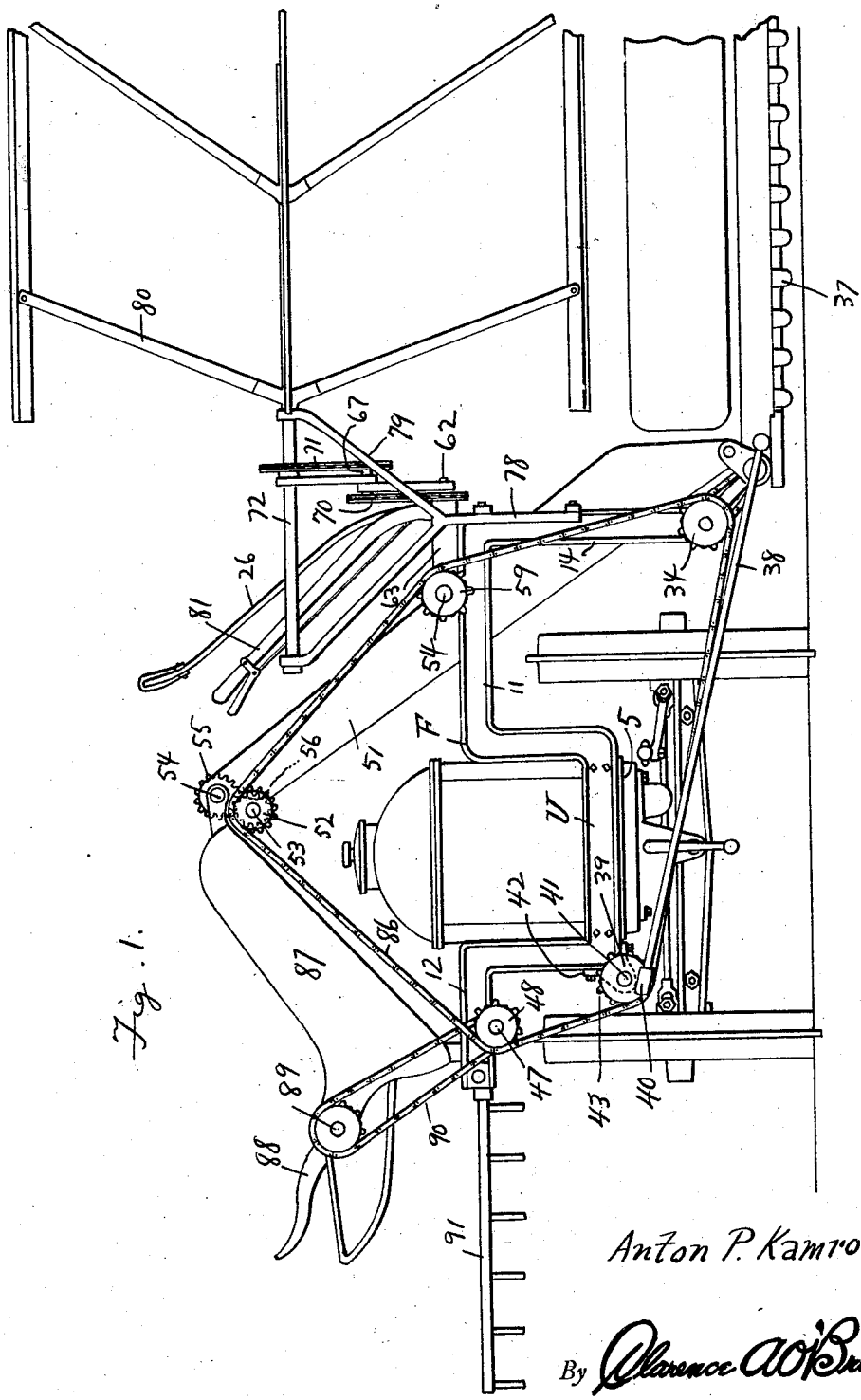
Inventor
Anton P. Kamrowski
By Clarence A O'Brien
Attorney

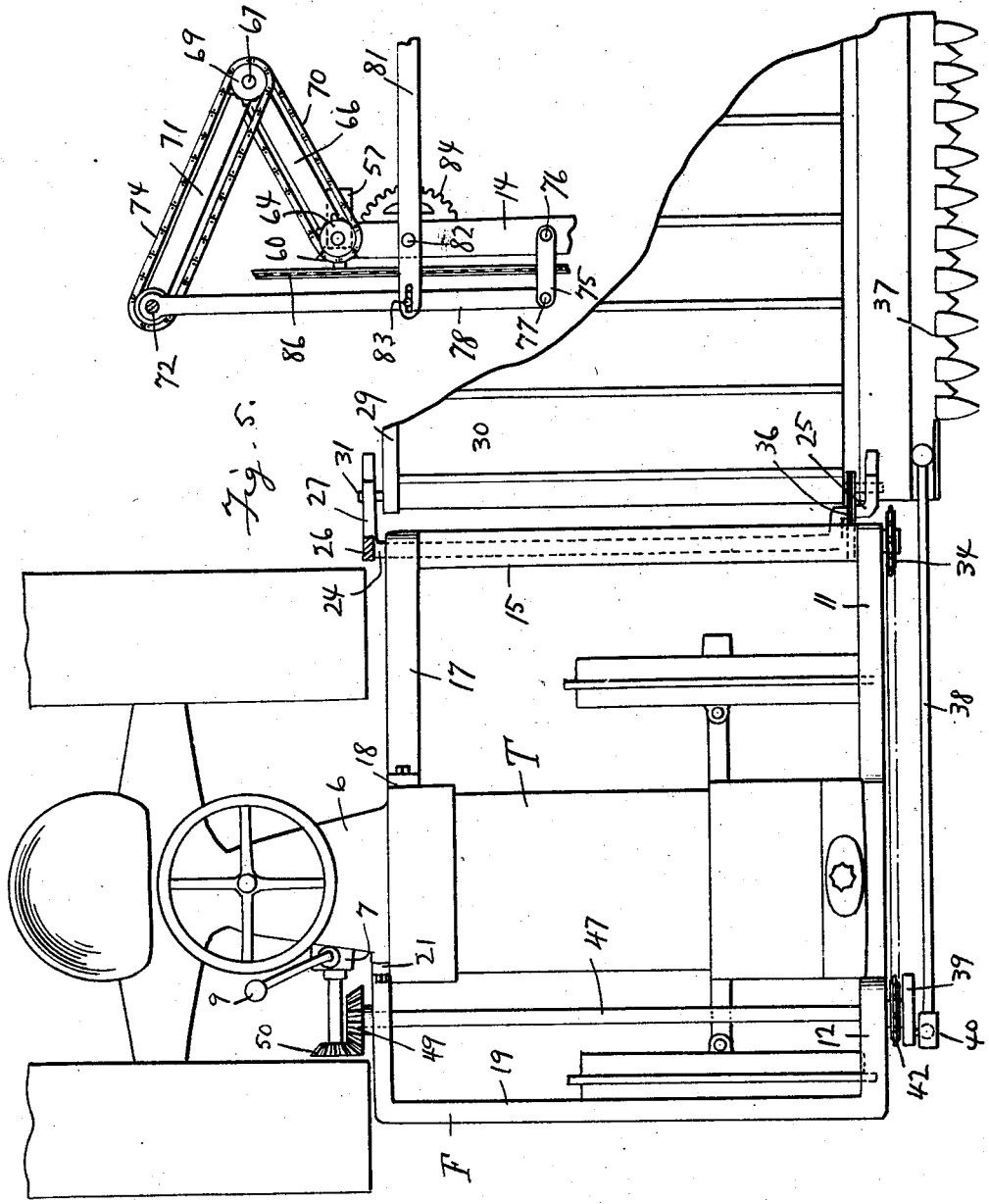

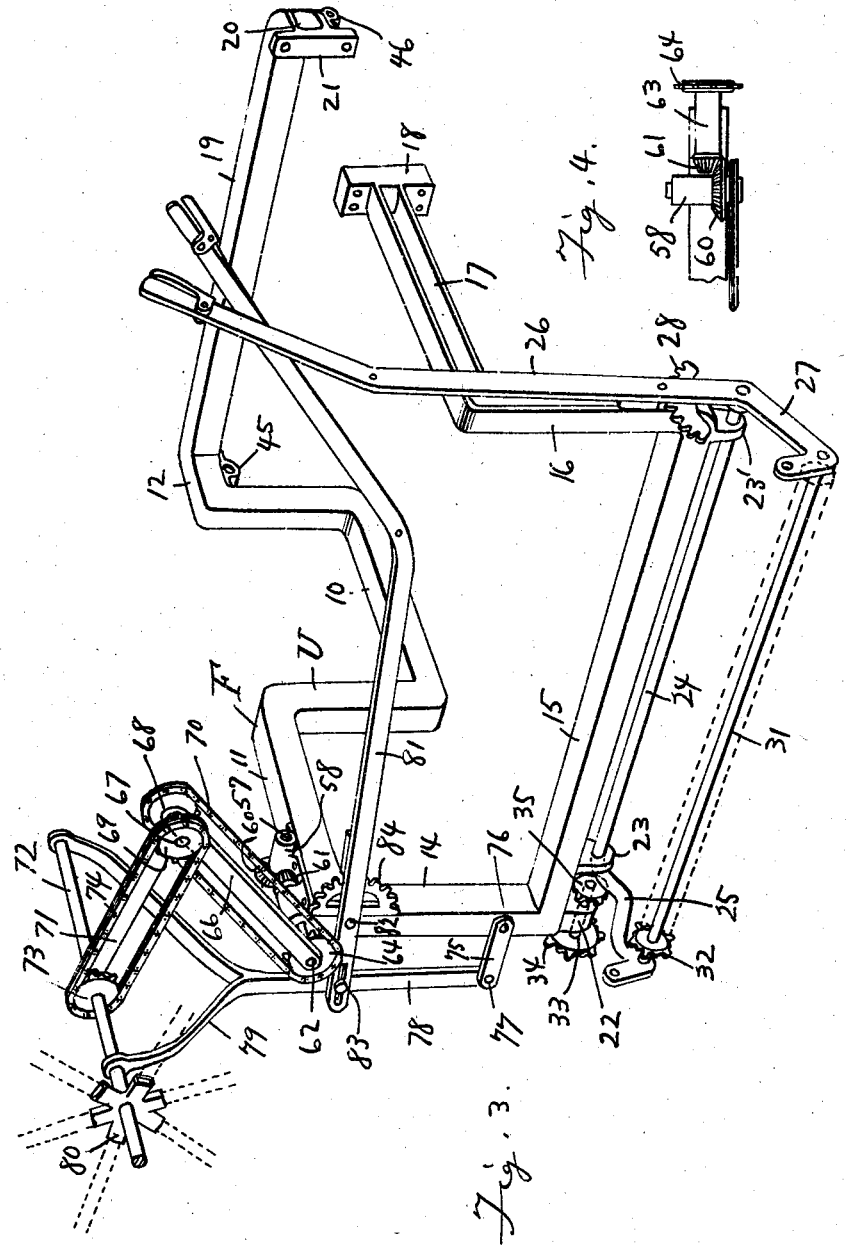

Patented Apr. 29, 1930

1,756,199

UNITED STATES PATENT OFFICE

ANTON P. KAMROWSKI, OF COCHRANE, WISCONSIN

TRACTOR GRAIN BINDER

Application filed February 9, 1928. Serial No. 253,058.

The present invention relates to a harvester generally and more particularly to a combination of a harvester with a tractor so that the parts of a grain binder may be mounted on the tractor to be carried thereby and to be operated thereby.

Another very important feature of the invention resides in the provision of a novel frame structure for the parts of the binder so that said frame structure may be attached to the tractor for positioning the parts of the binder in proper co-relative position in respect to one another.

Another very important feature of the invention resides in the provision of a combined tractor and binder structure of this nature having a driving connection with the tractor through the usual take off pulley shaft of the structure.

A further important object of the invention resides in the provision of a platform structure in a tractor grain binder of this nature wherein said platform may be tilted and the reel may be manipulated for accommodating the contour of the ground over which the machine is operating such as when the platform is operating along a hillside or the like.

A still further very important object of the invention resides in the provision of a tractor grain binder of this nature which is comparatively simple in its construction, easy to manipulate and control and thoroughly efficient and reliable in its operation.

With the above and numerous other objects in view as will appear as the description proceeds, the invention resides in certain novel features of construction, and in the combination and arrangement of parts as will be hereinafter more fully described and claimed.

In the drawing:

Figure 1 is a fragmentary front elevation of the machine embodying the features of my invention, Figure 2 is a fragmentary top plan view thereof, showing the parts with the reel, elevator and bundling mechanisms, removed, Figure 3 is a perspective view illustrating more particularly the attachment frame and means for tilting the platform and the reel, Figure 4 is a detail view of gearing for transmitting motion to the reel, and Figure 5 is a detail elevation showing the operating mechanism for the reel.

Referring to the drawing in detail it will be seen that the letter T denotes a well known form of tractor which includes among other well known parts a frame 5, a clutch housing 6, a pulley shaft housing 7, a pulley shaft 8, a clutch control lever 9 for the pulley shaft 8, etc., all of which are well known and conventional in the art.

The letter F denotes generally my improved attachment frame which is formed from a single channel bar bent in the manner illustrated to advantage in Figure 3 and shown in application in Figures 1 and 2 so as to provide a U-shaped portion the bight 10 of which is secured to the front of the frame 5 below the radiator of the tractor so that the legs of the U rise upwardly and merge into outwardly and laterally extending arms 11 and 12 the former being relatively long and the latter being relatively short. The relatively long arm 11 merges into a depending arm 14 which in turn merges into a rearwardly extending side bar 15 terminating in a rising arm 16 which merges into an inwardly and horizontally extending arm 17 terminating in a plate 18 attached to one side of the clutch housing 6. The relatively short arm 12 merges into a rearwardly extending side bar 19 the rear end of which is bent inwardly as at 20 and terminates in a plate 21 attached to the other side of the clutch housing 6.

The side bar 15 has depending therefrom a bearing 22 at the front end, a bearing 23 adjacent the front end and a bearing 23' at the rear end. A rod 24 is journaled in the bearings 23 and 23' and at one end has an arm extension 25. A lever 26 is engaged on the other end of the rod 24 and is formed with an arm 27. Suitable means 28 is provided for holding the lever 26 in different adjusted positions, it being understood that the rod 24 is rocked by said lever. A platform 29 is mounted on the arms 25 and 27 and has an apron 30 movable thereacross in the usual well known manner and operated by a shaft 31 in the usual well known manner. This shaft 31 has a sprocket 32 on one end thereof. A shaft 33 is journaled in the bearing 22 and has a sprocket 34 at one end and a sprocket 35 at the other end thereof. A chain 36 is trained over sprockets 32 and 35. A sickle 37 is mounted across the front end of the platform 29 and the bar thereof is operated by a pitman 38 eccentrically engaged with a disk 39 as at 40.

The disk 39 is fixed on a stub shaft 41 journaled on a bracket 42 at the lower right hand corner of the U-shaped portion U of the frame F. This shaft 41 has a sprocket 43 fixed thereon. Bearings 45 and 46 are mounted below the arm 12 and the inwardly turned end 20 respectively and rotatably receives a shaft 47 on the front end of which is mounted a sprocket 48 and on the rear end of which is mounted a beveled pinion 49 meshing with a beveled pinion 50 fixed on the pulley shaft 8 in place of the usual pulley. An apron elevator 51 inclines upwardly from and to the side of the platform 29 to extend between arms 14 and 16 and the usual lower apron thereof (not shown) is operated by a sprocket 52 and shaft 53 which operates the upper apron thereof (not shown) by a shaft 54 and gearing 55 and 56. A shaft 57 is journaled in a bearing 58 mounted on the arm 11 longitudinally of the frame F. A sprocket 59 is mounted on the front end of this shaft 57 and a beveled gear 60 is mounted on the forward portion of said shaft and meshes with a beveled pinion 60 on a shaft 62 journaled in a bearing 63 on the arm 11 at right angles to the bearing 58. On the outer end of the shaft 62 there is fixed a sprocket 64. A link 66 has one end rockably mounted on the outer extremity of the shaft 62 and at its upper end has journaled a stub shaft 67 with a sprocket 68 on one end and a sprocket 69 on the other end thereof. A chain 70 is trained over the sprockets 68 and 64. A link 71 is rockable on the shaft 67 and rotatably receives a shaft 72 on which is mounted a sprocket 73. A chain 74 is trained over the sprockets 73 and 69. A link 75 is rockable as at 76 on the depending arm 14 adjacent the lower end thereof and is pivotally engaged as at 77 with a rising bracket 78 the upper end of which is formed to provide arm extensions 79 in the extremities of which is journaled the shaft 72 of a reel structure 80 that extends across the platform. A lever 81 is rockable intermediate its ends as at 82 on the upper portion of the depending arms 14 and has a pin and slot connection 83 with an intermediate portion of the rising bracket 78. Suitable means 84 is associated with the lever 81 so as to hold it in different adjusted position. It will be quite apparent from a consideration of the lever 81 and associated parts that this lever 81 may be adjusted for raising and lowering the reel structure 80 and that the links 66 and 71 with the chain and sprocket mechanism associated therewith will automatically adjust themselves to accommodate the height of the reel for the continued operation thereof as will become apparent as the description proceeds. A chain 86 is trained over the sprockets 48, 52, 59, 34 and 43 so that when the sprocket 48 is rotated through the shaft 47, the pinions 49 and 50 from the pulley shaft 8 all of the other sprockets 52, 34 and 45 will rotate in a similar direction therewith through the chain 86 thereby causing the operation of the reel through the chain and sprocket mechanisms on links 66 and 71 and the operation of the sickle bar through the pitman and disk on the shaft 41 and, of course the apron of the apron elevator 51 will be actuated by the sprockets 52 and associated gearing. The numeral 87 denotes the butter mechanism of conventional construction leading downwardly from the upper end of the apron elevator or conveyor structure 51. A binding mechanism 88 is at the lower end of the butter mechanism 87 and is operated by a shaft 89 operatively connected with the shaft 47 by a chain and sprocket mechanism 90. A bundle platform 91 projects laterally from the side bar 19 below the binder mechanism 88.

It is thought that the construction, operation and advantages of the invention will now be quite apparent without a more detailed description thereof.

It will be seen that because of the novel frame structure provided that the conventional parts of a grain binder may be supported on a conventional tractor to be carried thereby from place to place.

It will further be seen that the platform may be adjusted to accommodate a hillside or the like and that the reel may be raised and lowered to accommodate the height of the grain. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. As a new article of manufacture, an attachment frame for supporting the parts of a binder on a tractor comprising a bar bent to provide a U-shaped portion one leg of which merges into a relatively long sidewardly extending arm merging into a depending arm, said depending arm merging into a rearwardly extending side arm, the other leg of the U-shaped portion merging into a relatively short sidewardly extending arm which in turn merges into a rearwardly extending side bar.

2. As a new article of manufacture, an attachment frame for supporting the parts of a binder on a tractor comprising a bar bent to provide a U-shaped portion one leg of which merges into a relatively long sidewardly extending arm merging into a depending arm, said depending arm merging into a rearwardly extending side arm, the other leg of the U-shaped portion merging into a relatively short sidewardly extending arm which in turn merges into a rearwardly extending side bar, inwardly disposed extensions on the second mentioned side bar, a rising arm on the first mentioned side bar terminating in an inwardly directed extension.

3. In a binder structure, a bracket, a frame, means for adjustably mounting the bracket on the frame, a reel journaled on said bracket and including a shaft, a second shaft journaled on the frame, a link engaged with the second shaft, a link engaged with the first shaft, a shaft pivotally connecting the links, a chain and sprocket connection between the first and third shaft and a chain and sprocket mechanism between the second and third shaft.

4. In a binder structure, a bracket, a frame, means for adjustably mounting the bracket on the frame, a reel journaled on said bracket and including a shaft, a second shaft journaled on the frame, a link engaged with the second shaft, a link engaged with the first shaft, a shaft pivotally connecting the links, a chain and sprocket connection between the first and third shaft, means operatively connecting the shafts together.

In testimony whereof I affix my signature.

ANTON P. KAMROWSKI.